United States Patent [19]

Gadkaree et al.

[11] Patent Number: 4,711,860
[45] Date of Patent: Dec. 8, 1987

[54] MODIFIED CORDIERITE GLASS CERAMIC COMPOSITE

[75] Inventors: Kishor P. Gadkaree, Big Flats; William L. Haynes; Kun-Er Lu, both of Painted Post, all of N.Y.

[73] Assignee: Corning Glass Works, Corning, N.Y.

[21] Appl. No.: 838,806

[22] Filed: Mar. 12, 1986

[51] Int. Cl.$^4$ ............................................. C03C 10/08
[52] U.S. Cl. ......................................... 501/9; 501/32; 501/56; 501/73; 501/95; 501/97; 65/33
[58] Field of Search ................... 501/9, 32, 95, 97, 56, 501/73; 65/33

[56] References Cited

U.S. PATENT DOCUMENTS

| | | | |
|---|---|---|---|
| 4,069,058 | 1/1978 | Washburn | 501/97 |
| 4,101,616 | 7/1978 | Buljan | 501/97 X |
| 4,542,109 | 9/1985 | Pasto | 501/97 |

Primary Examiner—Ferris H. Lander
Attorney, Agent, or Firm—C. S. Janes, Jr.

[57] ABSTRACT

A composite glass ceramic material which comprises silicon nitride ($Si_3N_4$) whiskers in a glass ceramic material comprising nitrogen doped cordierite, which composite material has greatly increased strength at elevated temperatures, good microwave transparency, and good thermal shock resistance.

The invention further comprises a method for manufacturing the composite material by blending ground nitrogen doped cordierite glass with between about 5 and about 50 percent $Si_3N_4$ whiskers by weight of glass. The blend is then formed into a desired shape and is sintered at an elevated temperature of from about 1000° to 1400° C.

The invention also includes the novel nitrogen doped cordierite glass and glass ceramic made therefrom.

23 Claims, 2 Drawing Figures

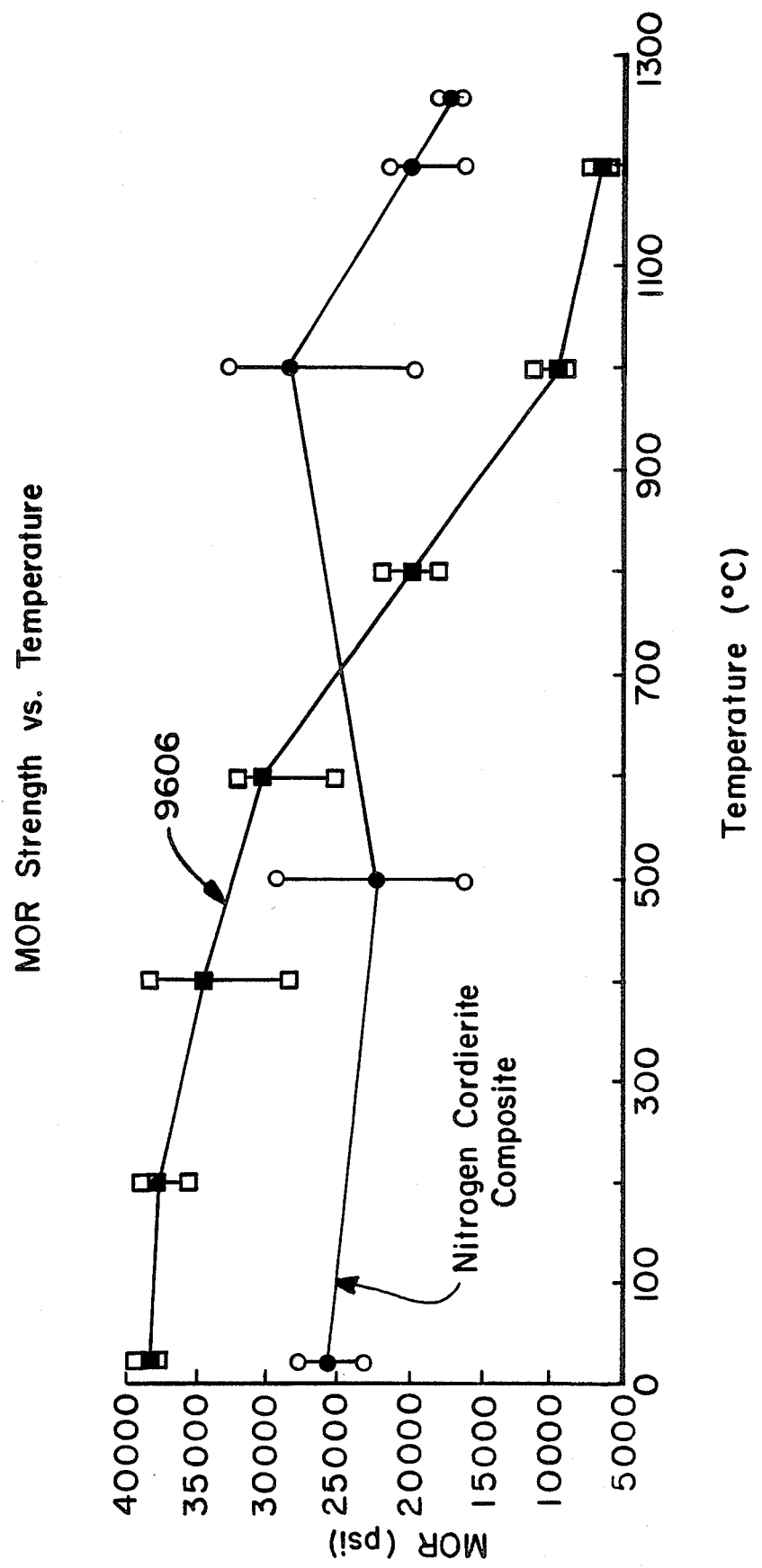

MODIFIED CORDIERITE GLASS CERAMIC COMPOSITE

BACKGROUND OF THE INVENTION

This invention relates to glass ceramic composite materials and more particularly relates to reinforced cordierite type glass ceramics.

It has been known in the prior art, e.g. from U.S. Pat. Nos. 2,920,971; 4,070,198 and 4,415,672, that glass ceramics could be obtained through the controlled crystallization of a glass body to form relatively uniformly sized, fine grained crystals homogeneously dispersed throughout a residual glassy matrix. The residual glassy matrix will generally have a composition different from that of the precursor glass body since components comprising the crystal phase will have been removed from the glass.

Such glass ceramics therefore have properties which are radically different than the precursor glass material. Such glass ceramics may for example have improved strengths, higher temperature capabilities, improved resistance to thermal shock and altered, often lower, coefficients of thermal expansion. Despite the elapse of several decades since the discovery of glass ceramics, improved glass ceramics are still constantly being sought by trial and error. This is due to the continually increasing requirements for high performance materials as a result of advancing technology and is also due to the difficulty of predicting the properties of a glass ceramic prior to its development and testing. In a particular application, to protect electronic parts in a high temperature environment, e.g. in a high velocity atmospheric vehicle, the ceramic, in addition to high temperature resistance, must also retain good strength, have a high degree of microwave transparency and desirably have good thermal shock resistance. A glass ceramic which has been used in these applications is described in U.S. Pat. No. 2,920,971. While this material, which comprises MgO, $Al_2O_3$, $SiO_2$ and $TiO_2$, is adequate for present applications, future requirements for similar applications will demand greater refractoriness and higher temperature strength, e.g. >1200° C., greater thermal shock resistance, and minimum change of a low dielectric constant over a broad range of temperatures and frequencies while maintaining microwave transparency. Attempts to reinforce these older ceramic materials with ceramic fibers or crystalline whiskers have not been very successful since one or more properties are adversely affected, often by lack of adhesion of the glass ceramic to the reinforcing material for reasons not clearly understood, see e.g. "Development of Broadband Radome Material", Laden et al, July 1982, United Technologies Research Center Report AFWAL-TR-82-4100.

A nitrogen containing glass material has been developed which can be converted to a glass ceramic material without the presence of usual crystal nucleating agents, such as $TiO_2$, $ZrO_2$ or $SnO_2$. The materials, e.g. as specifically described in U.S. Pat. Nos. 4,070,198 and 4,097,295, still lack some of the physical properties desired for the newer requirements.

BRIEF DESCRIPTION OF THE INVENTION

In accordance with the present invention, there is provided a composite glass ceramic material which comprises silicon nitride ($Si_3N_4$) whiskers in a glass ceramic material comprising nitrogen doped cordierite. The composite material has greatly increased strength at elevated temperatures, and desirably has good microwave transparency with minimum dielectric constant change vs. temperature and good thermal shock resistance. The desired material is a composite material which comprises between about 5 and about 50 weight percent $Si_3N_4$ whiskers and between about 50 and 95 weight percent nitrogen doped cordierite glass ceramic. There is unexpectedly good binding between the glass ceramic and the silicon nitride whiskers.

The invention further comprises a method for manufacturing the composite material by blending ground nitrogen doped cordierite glass having an average particle size of preferably less than 20 microns with between about 5 and about 50 percent $Si_3N_4$ whiskers by weight of glass. The whiskers preferably have an average length of between 10 and 300 microns and an average aspect ratio of between 10 and 1000. The blend is then formed into a desired shape having sufficient density to be thermally consolidated at above 1000° C. to result in a material having a modulus of rupture of at least 7000 psi at 1200° C. The shape is heated at an elevated temperature of above 1000° C. for from about 15 minutes to more than about two hours. The heating may occur under pressure, as in hot pressing, or may occur at atmospheric pressure as in pressureless sintering.

The invention also includes the novel nitrogen doped cordierite glass and glass ceramic made therefrom.

BRIEF DESCRIPTION OF THE DRAWINGS

FIG. 2 is a graph of modulus of rupture against temperature.

DETAILED DESCRIPTION OF THE INVENTION

Figure 1:
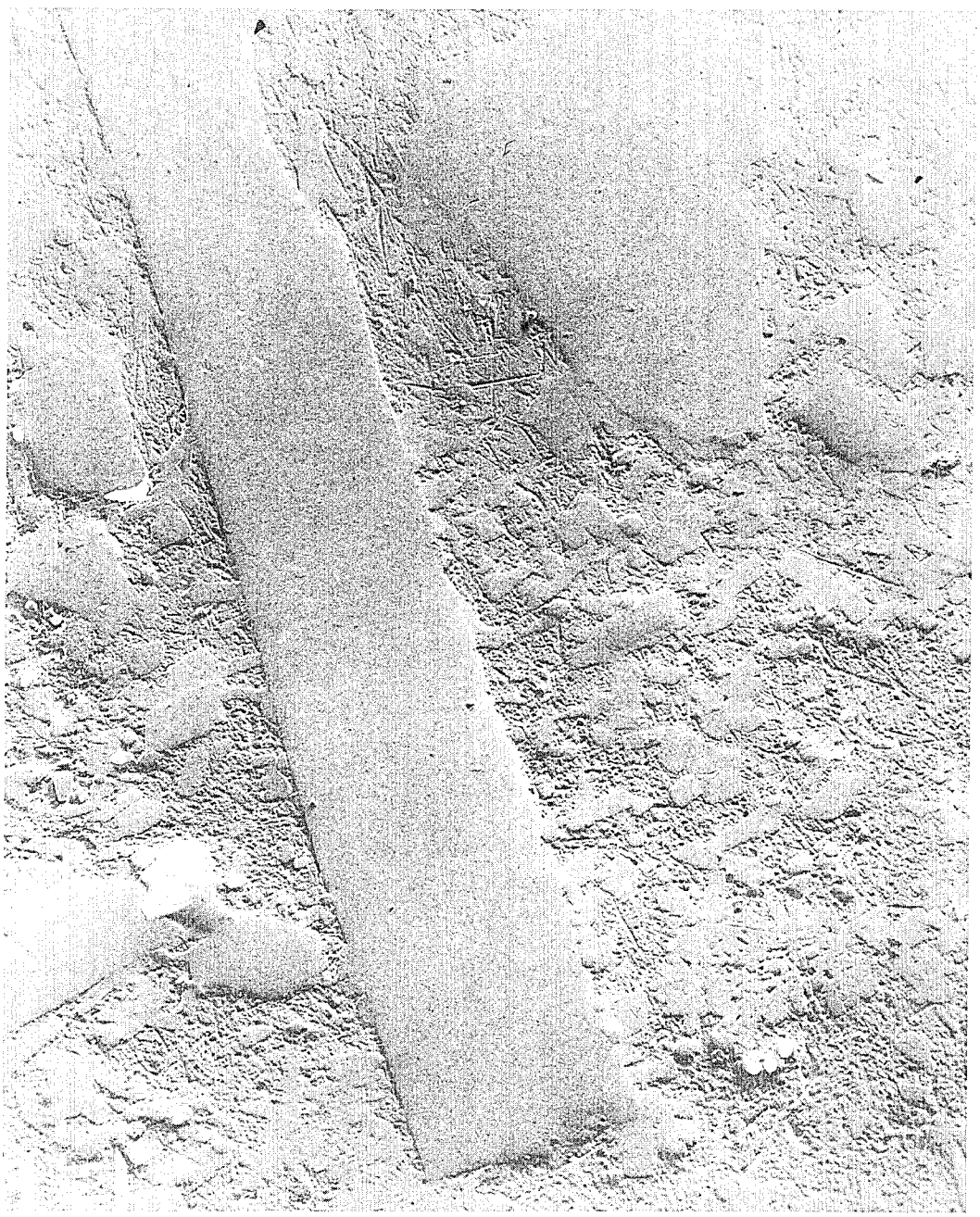
FIG. 1 is a transmission electron microscope photomicrograph of the composite of the invention.

"Glass ceramic" as used in the present invention refers to that group of ceramic materials prepared by causing the formation of microcrystals in a glass body by a particularly defined heat treatment to form a body which is highly crystalline, i.e. greater than 50% crystalline, and in which the crystals are evenly dispersed but usually randomly oriented throughout residual glass. A glass ceramic has substantially different properties than the parent glass.

"Cordierite" is a magnesium aluminum silicate glass material having the stoichiometric formula $Mg_2(Al_4Si_5O_{18})$. Cordierite occurs naturally, e.g. in Madagascar, but also may be man made.

The modified cordierite glass of the invention is cordierite into which nitrogen has been incorporated. In addition to adding other desirable properties, the nitrogen enhances nucleation of crystals to form a glass ceramic. The nitrogen is preferably but not essentially obtained by including silicon nitride, along with magnesium oxide, alumina and silica, in the melt to form the glass. A specific preferred melt composition, as shown in Table I, is 14.0 percent MgO, 36.2 percent $Al_2O_3$, 37 percent $SiO_2$ and 12.8 percent $Si_3N_4$. The nitrogen doped cordierite, in accordance with the present invention, has the approximate stoichiometric formula:

$$Mg_2Al_4Si_5O_{18-3x}N_{2x}$$

where x is between 0.1 and 1.40 and preferably between 0.4 and 1.25. The most preferred range of x is between 0.75 and 1.15. It is of course to be understood that variations of a few percentage points, from the relative percentages of elements imposed by the stoichiometric formula, is in most cases permissible in accordance with the present invention. The value of x should not, however, usually exceed 1.40 and preferably not exceed 1.25 since larger amounts of nitrogen tend to cause devitrification. The fusing of the components of the glass is preferably done in a nitrogen atmosphere to avoid loss of nitrogen from the system. "Approximate" stochiometric formula means that the ratios of the elements may vary by a few percentage points.

Modified cordierite glass of the present invention may be turned into a glass ceramic by heating at a sufficient temperature and time to form microcrystals. The temperature is generally between 1000° C. and 1400° C. for from 15 minutes to more than 2 hours. The glass ceramic has good density, hardness, viscosity, and resistivity characteristics.

It has further been discovered, in accordance with the present invention, that a reinforced glass ceramic composite having exceptional properties can be made from the modified cordierite glass previously described and silicon nitride whiskers.

The composite can be made by blending ground nitrogen doped cordierite glass having an average particle size of less than 50, preferable less than 20 microns and most preferably less than 10 microns with between about 5 and about 50 weight percent $Si_3N_4$ whiskers by weight of glass. The blending can be accomplished by any suitable means, such as air agitation or mixing in a liquid medium. When the glass and whiskers are mixed in a liquid, the mixture is subsequently processed, e.g. by centrifuging or filtration, to remove such liquid. The blend is then formed into a desired shape by any suitable means such as casting, pressure molding or pressure extrusion. The forming is such that the shape has a sufficient density to be thermally consolidated at above 1000° C. to result in a material having a modulus of rupture of at least 7000 psi at 1200° C. The shape is simultaneously or subsequently heated to above 1000° C. and preferably between 1200° and 1400° C. for from about 15 minutes to 2 hours and preferably from about 30 to 90 minutes. The blend, for example, may be hot pressed into the desired shape at from about 1200° to about 1400° C., preferably 1300 to 1400° C., for from about 15 to about 90 minutes, preferably 25 to 40 minutes, at from about 1000 to about 4000 psi, preferably 2500 to 3500 psi.

The silicon nitride whiskers are incorporated into the composite in an amount of between 5 and 50 percent by weight of glass and preferably between 15 and 30 percent. The preferred whiskers are generally believed to be silicon nitride crystals which have an average aspect ratio of between 5 and 1500 and preferably between 10 and 1000 and preferably have an average length of between 10 and 300 microns. The average width or diameter of the crystals may vary widely but is preferably between 0.1 and 2.5 microns.

The invention may be further illustrated, but not limited by, the following examples. Unless otherwise indicated, all parts and percentages are by weight.

A number of melts containing 14% MgO, 36.2% $Al_2O_3$, 37% $SiO_2$, and 12.8% $Si_3N_4$ were made in an induction heated furnace with a typical batch size of 1000 gms. Ball milled batch materials were melted in an uncovered molybdenum crucible by induction heating. The melt was poured into a hot graphite mold and annealed. All steps were performed in a nitrogen atmosphere within the furnace. The 1000 gram batches were melted at 1650° C. for 4 hours. The glass was a homogeneous dark gray-black color and retained about 85% of the batched nitrogen. An annealing schedule of 880° C. for 1 hour followed by cooling at a rate of 20° C. per hour for 24 hours produced uncracked patties. Good glass patties (6"×6"×½") were made.

A comparison of viscosity curves between stoichiometric cordierite glass and the cordierite glass containing 4.3% N shows that nitrogen addition increases the viscosity witnessed by a 90° C. increase on the strain, anneal, and softening points. Attempts to further increase the nitrogen level (6.8% N batched) resulted in early signs of devitrification.

Patties of the glass were crushed into glass particles. The glass particles were further reduced in size by ball milling. A particle size analysis showed an average size of about 10 microns with a distribution of from about 1 micron to 50 microns with over 95% of the particles being smaller than 35 microns.

The $Si_3N_4$ whiskers used in this example are gray in color, are crystaline, are greater than 97% in the $\alpha$ phase, with diameters of approximately 0.2–2.5 microns and lengths of 30–300 microns. This size makes the raw material look like a powder. These sizes were determined by SEM photographs and X-ray diffraction. The literature gives a value for the whisker density of 3.18 gm/cc and gives a sublimation temperature of 1900° C. Other desirable whisker properties are high tensile strengths, resistance to thermal shock, hardness, high electrical resistance, minimum shrinkage at high temperatures, and chemical durability.

The appropriate amount of glass powder and whiskers (60 gm total) was added to 350 cc of an isopropanol/water mixture (75 vol% isopropanol) and mixed in a blender for 10 minutes at various speed settings. The resulting slurry was vacuum filtered producing a 1" thick patty. The patty, dried at 95° C., contained little green strength but was able to be handled and loaded into a hot press mold.

The hot press, used for experimentation, was an induction heated unit. The mold assembly used for all hot pressings, comprising a circular mold body, is 6" o.d.×3" i.d.×4½" high. A 7/16" diameter hole drilled down the plunger allowed a thermocouple to be placed ⅜" from the top of the sample with readings recorded as sample temperature. The ram pressure was applied at the start and removed 5 minutes before cool down. It was found that it was desirable to cool under no ram pressure to prevent sample cracking. All hot pressings were done in vacuum.

Initial hot press experiments were conducted at 1300° C. for 60 minutes under 2000 psi. The resulting hot pressed samples were 3" in diameter by 0.180" thick and a uniform gray color. The samples were processed by grinding into bars for testing modulus of rupture (MOR). The bars were 2"×0.200"×0.080" with a fine ground surface. The effects of $Si_3N_4$ whisker loading on MOR strength were measured at 25° C. Three samples at each whisker loading were measured using a 4-point bending apparatus. The hot pressed nitrogen cordierite material had a mean strength of 20,500 psi and was unaffected by the addition of 5 wt% whiskers. Whisker loadings of 15, 25, and 30 wt% gave mean MOR strengths of 24,400, 22,900, and 24,900 psi, respectively. This increase in MOR strength of approximately 17% clearly demonstrated reinforcement by whisker addition. The unreinforced material had a mean density of 2.71 gm/cc while reinforced samples showed mean densities of 2.79 gm/cc.

In an effort to maximize strength, a processing matrix was conducted in which hot press temperature, time, and pressure were investigated. The whisker loading was held constant at a 25 wt% level. Sample surfaces were fine ground and tested using the 4-point bending technique. The results suggest an optimum hot press schedule of 1350° C. for 30 minutes at 3000 psi. Resulting mean MOR strength values at 25° C. are 25,600 psi with corresponding densities of 2.79-2.81 gm/cc. During these investigations, abraded and polished sample finishes were evaluated. In most cases, the abraded surface decreased MOR strength approximately 1000 psi. Due to the super hardness of the hot pressed composite (KHN of about 900 at 500 gm load), polished surfaces were very difficult to obtain. No increase in strength was witnessed with polished surfaces. All samples broke in a brittle fashion. The hot press schedule of 1350° for 30 minutes at 3000 psi was selected for continued processing to make samples for property measurements of the composite.

FIG. 1 is a transmission electron microscopy (TEM) photomicrograph of the hot pressed composite after polish and acid etch which shows three distinct phases present, a continuous or bulk phase, a second unidentified phase and a larger rectangular phase. The bulk phase is the cordierite structure as identified by X-ray diffraction. The second phase, less than a micron in diameter, remains unidentified: however, SEM analysis shows comparable levels of Si and Al as in cordierite with Mg levels reduced from minor to trace amounts. The X-ray diffraction pattern of this material shows the typical cordierite structure with unidentified peaks which closely match SiAlON. It is believed that the unidentified phase is probably a Mg-deficient cordierite structure enriched with nitrogen. The larger rectangular phase is $\alpha Si_3 N_4$ whiskers. The X-ray diffraction pattern shows a high degree of crystallinity suggesting little residual glass. Analysis of thin film TEM sections shows evidence of good bonding of the whisker to the matrix material.

Strength is an important factor in designs for high velocity atmospheric vehicles. In addition to handling stresses, wall thickness is critical because of sensitivity to the operating frequency and dielectric constant of the material. Also, higher temperatures resulting from faster speeds and longer flight patterns dictate greater thermal shock resistance and refractoriness.

A study was conducted in which MOR strength as a function of temperature was measured for hot pressed samples of nitrogen cordierite glass ceramic and reinforced nitrogen cordierite glass ceramic (25 wt% whiskers). These results were compared to the published values for Code 9606 glass ceramic (fortified) and shown in FIG. 2. Five samples were measured at each indicated temperature with connected means bounded by high and low ranges. All measurements were from 4-point loadings. At 25° C., the composite material has approximately 65% of the MOR strength shown by Code 9606 (fortified); however, this reverses with increasing temperature and at 1200° C. the nitrogen cordierite glass ceramic composite has a strength about 3 times greater. Although somewhat lower in comparison, e.g. 21200@25°-15300@1200° C., the unreinforced hot pressed nitrogen cordierite glass ceramic exhibits the same trend. The sample bars from the composite maintained their integrity at 1200° C. and bent slightly at 1260° C. The slight deformation under load at 1260° C. is not surprising since samples were held at this temperature for 1-2 hours prior to being stressed. Similar results were observed for the unreinforced material.

Thermal shock has not been measured for these materials; however, through the measured values of MOR strength, thermal expansion, elastic modulus, and poisson's ratio a figure or merit ($\Delta T$) was calculated from the following equation:

$$\Delta T = \frac{MOR(1 - \mu)}{\alpha E}$$

where
 MOR = Strength
 $\mu$ = Poisson's Ratio
 E = Elastic Modulus
 $\alpha$ = Thermal Expansion Coefficient Using measured values at 25° C., the calculated $\Delta T$ values are: 285 for Code 9606, 380 for the nitrogen cordierite glass ceramic, and 341 for the reinforced nitrogen cordierite glass ceramic composite.

Table II illustrates results from dielectric constant and loss tangent testing at microwave frequencies and temperatures to 1100° C. Shown are comparisons between 9606, nitrogen cordierite glass ceramic, and nitrogen cordierite glass ceramic composite containing 25 weight % $Si_3N_4$ whiskers. Samples were hot pressed as previously described but to a thickness suitable for microwave testing. The increase in dielectric constant from 25 to 1100° C. (shown in parenthesis) is significantly better for the nitrogen cordierite glass ceramic composite and microwave transparency is good as shown by low loss tangents.

Measurements of thermal expansion with temperature were made using a dilatometer, recording fractional length increase as a function of temperature from 25 to 1000° C. Hot pressed nitrogen cordierite glass ceramic and the nitrogen cordierite glass ceramic composite (25 wt% whisker) show similar results having expansion coefficients of 30 and $32 \times 10^{-7°}$ C., respectively at 1000° C. Both materials show lower thermal expansion coefficients than 9606.

The moduli for length (Young's Modulus) and shape (Shear Modulus) elasticity were measured as a function of temperature. Measurements were made using the sonic resonance technique. Hot pressed samples of the nitrogen cordierite glass ceramic and the nitrogen cordierite glass ceramic composite show fairly constant moduli as a function of temperature with the composite having slightly higher values, i.e., 27 vs $23 \times 10^6$ psi for Young's Modulus and 11 vs $9 \times 10^6$ for Shear Modulus. Both materials have higher moduli than Code 9606. Poisson's Ratio for the three materials were calculated as a function of temperature. Code 9606 has the lower values with an average ratio of 0.237 compared to average values of 0.285 for the hot pressed materials.

Specific heats were measured from 25° to 600° C. All materials show similar trends as the specific heat rises as a function of temperature. Hot pressed nitrogen cordierite glass ceramic has the highest average value of 0.254 cal/gm° C. with the composite and Code 9606 averaging 0.237 cal/gm° C.

Table III lists all properties measured for the hot pressed nitrogen cordierite glass ceramic and the composite (25 wt% $Si_3N_4$ whisker loading) as well as literature values for 9606 to be used in comparison. The composite shows a slightly higher fracture toughness value than the unreinforced hot pressed nitrogen cordierite glass ceramic: however, no dramatic improvement was witnessed over the the range listed for Code 9606. Knoop Hardness values are the highest for the composite representing a 44% increase over Code 9606 at the 500 gm load.

TABLE I

| (Wt %) Compositions | | | |
|---|---|---|---|
| | 9606 Glass | 2MgO.2Al$_2$O$_3$.5SiO$_2$ Cordierite | Nitrogen Cordierite Glass |
| MgO | 14.7 | 13.8 | 14.0 |
| Al$_2$O$_3$ | 19.7 | 34.9 | 36.2 |
| SiO$_2$ | 56.1 | 51.3 | 37.0 |
| Si$_3$N$_4$ | — | — | 12.8 |
| TiO$_2$ | 8.9 | — | — |
| Other | 0.6 | — | — |

TABLE II

| | 9606 | Nitrogen Cordierite Glass Ceramic | Nitrogen Cordierite Glass Ceramic Composite 25 Wt. % Si$_3$N$_4$ Whiskers |
|---|---|---|---|
| DIELECTRIC CONSTANT | | | |
| 8.5 GHz | | | |
| 25° C. | 5.42 | 5.66 | 5.84 |
| 500° C. | 5.66 | 5.85 | 6.02 |
| 1100° C.* | 5.97(10.1%) | 6.09(7.6%) | 6.21(6.3%) |
| 9.3 GHz | | | |
| 25° C. | 5.25 | 5.40 | 5.56 |
| 500° C. | 5.30 | 5.40 | 5.56 |
| 1100° C. | 5.60(6.7%) | 5.51(2.0%) | 5.65(1.6%) |
| *EXTRAPOLATED | | | |
| LOSS TANGENT | | | |
| 8.5 GHz | | | |
| 25° C. | .0004 | .0015 | .0042 |
| 500° C. | .0020 | .0030 | .0051 |
| 9.3 GHz | | | |
| 25° C. | .0009 | .0005 | .0005 |
| 1100° C. | .0080 | .0020 | .0020 |

TABLE III

| Property Comparisons | | | |
|---|---|---|---|
| | 9606 Glass Ceramic | Nitrogen Cordierite Glass Ceramic | Nitrogen Cordierite Glass Ceramic Composite |
| Density | 2.60 | 2.76 | 2.81 |
| Thermal Expansion Coefficient (10$^{-7}$) | | | |
| 300° C. | 54 | 17 | 20 |
| 1000° C. | 43 | 30 | 32 |
| Specific Heat (cal/gm °C.) | | | |
| 25° C. | .195 | .196 | .182 |
| 600° | .276 | .311 | .293 |
| Young's Modulus (10$^6$ psi) | | | |
| 25° C. | 17.2 | 23.3 | 27.1 |
| 1000° C. | 17.2 | 20.8 | 24.6 |
| Shear Modulus (10$^6$ psi) | | | |
| 25° C. | 6.9 | 9.0 | 10.6 |
| 1000° C. | 6.9 | 8.1 | 9.5 |
| Poisson's Ratio | | | |
| 25° C. | .243 | .290 | .278 |
| 1000° C. | .232 | .282 | .292 |
| Knoop Hardness (Kg/mm$^2$) | | | |
| 100 g load | 698 | 969 | 1072 |

TABLE III-continued

| Property Comparisons | | | |
|---|---|---|---|
| | 9606 Glass Ceramic | Nitrogen Cordierite Glass Ceramic | Nitrogen Cordierite Glass Ceramic Composite |
| 500 g load | 619 | 840 | 893 |
| Fracture Toughness ($K_{IC}$ — MPa $\sqrt{m}$) | 1-2 | 2.18 | 2.48 |
| MOR (psi) | | | |
| 25° C. | 35000 | 21200 | 25600 |
| 1200° C. | 7000 | 15300 | 20100 |
| Thermal Shock $\Delta T = \dfrac{MOR(1-\mu)}{E}$ | 285 | 380 | 341 |

What is claimed is:

1. A glass ceramic composite material comprising Si$_3$N$_4$ whiskers in a nitrogen doped cordierite glass ceramic wherein the material comprises between about 5 and about 50 weight percent Si$_3$N$_4$ whiskers and between about 50 and 95 weight percent nitrogen doped cordierite glass ceramic.

2. The glass ceramic composite material of claim 1 wherein the material comprises between about 15 and about 30 weight percent Si$_3$N$_4$ whiskers and between about 70 and 85 weight percent nitrogen doped cordierite glass ceramic and the Si$_3$N$_4$ whiskers have an average aspect ratio of between 5 and 1500.

3. The glass ceramic material of claim 1 wherein the Si$_3$N$_4$ whiskers have an average aspect ratio of between 10 and 1000 and an average length of between 10 and 300 microns.

4. The glass ceramic material of claim 1 wherein the cordierite glass material has the stoichiometric formula:

$$Mg_2Al_4Si_5O_{18-3x}N_{2x}$$

wherein x is between 0.1 and 1.40.

5. The glass ceramic material of claim 4 wherein x is from 0.4 to 1.25.

6. The glass ceramic material of claim 1 wherein the whiskers are uniformly distributed throughout the matrix.

7. The glass ceramic material of claim 1 wherein the material has a peak operating temperature greater than 1200° C., and a microwave loss tangent less than 0.005 at 9.3 GHz at 1100° C.

8. The material of claim 7 wherein the material has a dielectric constant at 1100° C. at 9.3 GHz of below 6 with less than an 8% change in dielectric constant from 25° C.

9. The glass ceramic material of claim 1 wherein the material has a modulus of rupture of greater than 16,000 psi at 1200° C.

10. The glass ceramic material of claim 1 wherein the material has a modulus of rupture of greater than 20,000 psi at 1200° C.

11. A method for making a glass ceramic composite material which comprises:
   blending nitrogen doped cordierite glass powder with between about 5 and about 50 percent Si$_3$N$_4$ whiskers by weight of glass;
   forming the resulting blend into a desired shape having sufficient density to be thermally consolidated at above 1000° C. to result in a material having a modulus of rupture of at least 1000 psi at 1200° C.; and heating the shape at above 1000° C. for from about 15 minutes to more than about 2 hours.

12. The method of claim 11 wherein the forming and heating occur simultaneously.

13. The method of claim 11 wherein the glass is ground glass having an average size of less than 20 microns, the blend is formed at pressure greater than about 1500 psi, the consolidation temperature is greater than about 1200° C. and the whiskers have an average aspect ratio of between 5 and 1500.

14. A method for making a glass ceramic composite material which comprises:

blending ground nitrogen doped cordierite glass powder having an average particle size of less than 20 microns with between about 5 and about 50 percent $Si_3N_4$ whiskers by weight of glass, said $Si_3N_4$ whiskers having an average aspect ratio of between 10 and 1000 and an average length of between 10 and 300 microns, forming the resulting blend into a desired shape, and hot pressing the shape at from about 1200 to about 1400° C. for from about 15 to about 90 minutes at from about 1000 to about 4000 psi.

15. The method of claim 11 wherein between about 15–30 weight percent whiskers are used and the shape is hot pressed at 1200° to 1400° C. for 25 to 40 minutes at 2500 to 3500 psi.

16. A cordierite glass having the approximate stoichiometric formula:

$$Mg_2Al_4Si_5O_{18-3x}N_{2x}$$

wherein x is between 0.1 and 1.40.

17. The glass of claim 16 wherein x is greater than 0.4 and less than 1.25.

18. The glass of claim 16 wherein x is between 0.75 and 1.15.

19. A glass ceramic having the approximate stoichiometric formula:

$$Mg_2Al_4Si_5O_{18-3x}N_{2x}$$

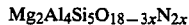

wherein x is between 0.1 and 1.40.

20. The glass ceramic of claim 19 wherein x is greater than 0.4 and less than 1.25.

21. The glass ceramic of claim 19 wherein x is between 0.75 and 1.15.

22. A glass ceramic formed by heating the glass of claim 16 at a sufficient temperature and time to form microcrystals.

23. A glass ceramic formed by heating the glass of claim 17 to between 1000° and 1400° C. for from 15 minutes to 2 hours.

* * * * *